United States Patent Office 2,842,399
Patented July 8, 1958

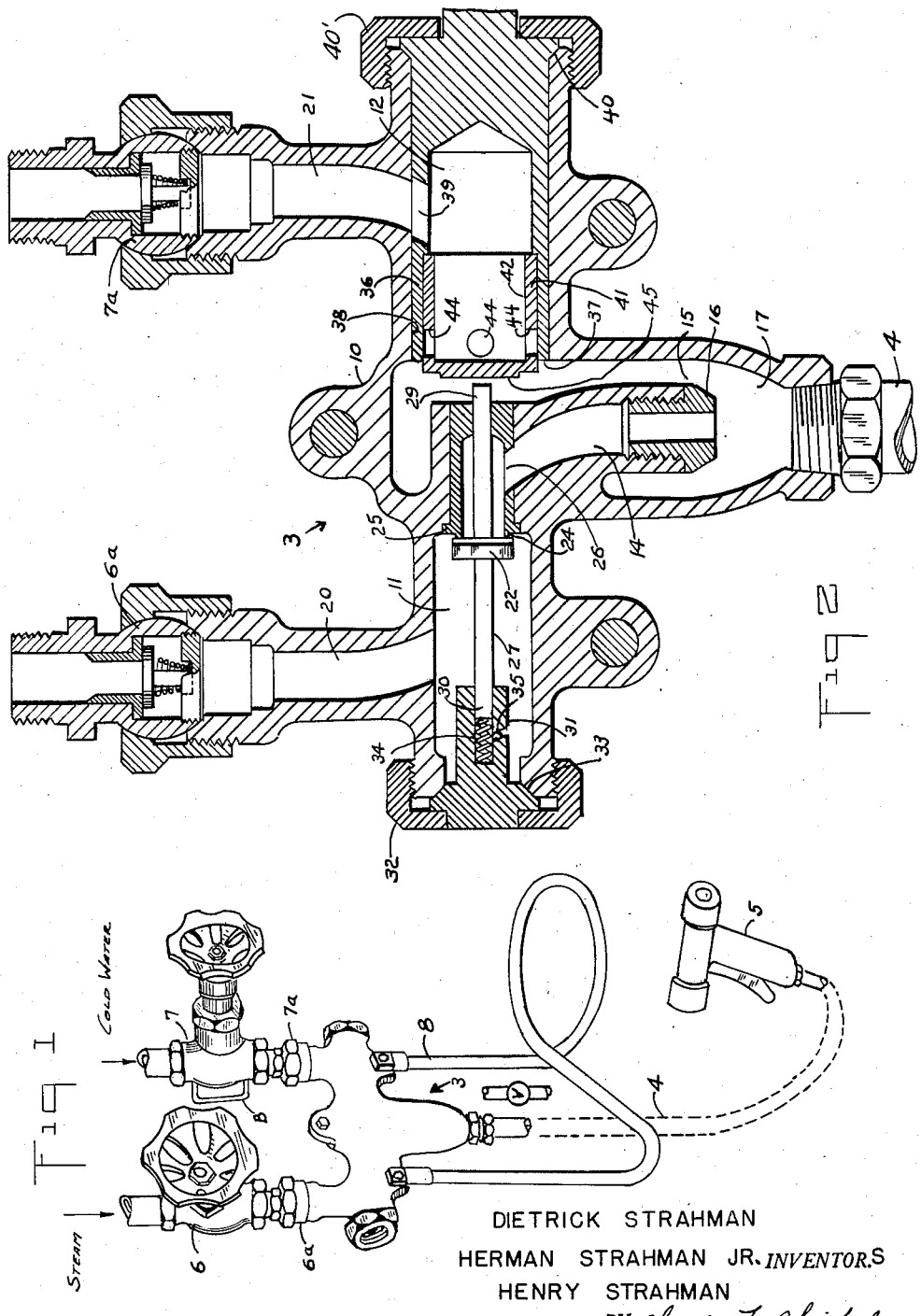

2,842,399
HOSING APPARATUS

Dietrick Strahman and Herman Strahman, Jr., Livingston, N. J., and Henry Strahman, New York, N. Y., assignors to Strahman Valves, Inc., New York, N. Y., a corporation of New York Application November 14, 1955, Serial No. 546,593

6 Claims. (Cl. 299—83)

This invention relates to apparatus for hosing dairies, industrial plants, tanks, equipment, etc. with hot water to cleanse the same.

Apparatus for hosing with hot water consists essentially of a source of hot water, a flexible hose, and a nozzle. The hose may be of any desired length, and the hoses now used by dairies are often as much as 50 feet long. The operator moves the nozzle about at will, and he may be interrupted while he is some little distance away from the regular control valves. Because of the ever-increasing shortage of water, it is desirable that the nozzle automatically cut off the flow of water except while the operator is positively holding it open for hosing purposes. Such a nozzle, sold as a "Water Saver," is shown in Strahman U. S. Patent 2,657,098, dated October 27, 1953.

For many cleansing purposes, the water that issues from the nozzle should be very hot. Hot water, especially very hot water, can usually be more economically and expeditiously provided by mixing steam with cold water at a point just in advance of the intake end of the hose. A unit for mixing steam and cold water and delivering the resultant hot water to the intake end of the hose is shown in Jaegle et al. U. S. Patent 2,569,857, dated October 2, 1951.

In using hosing apparatus in which steam is mixed with cold water just prior to the entrance of the water into the hose, there are various circumstances and contingencies under which live steam may enter the hose and endanger the operator and others who may be near him. The supply of cold water may fail suddenly due to drop in pressure or other cause, leaving only steam or a too large proportion of steam to enter the mixing chamber, with the result that live steam passes to the hose. Also the operator may turn on the steam line first and then his attention be distracted, with the result that the hose will fill with steam and he and others are endangered when he undertakes to commence his hosing. Further, steam may seep through at times when the main steam valve has been turned off due to wear or imperfect seating of valves which control the flow of the steam.

Among the objects of the present invention are to provide hot water hosing apparatus which reduces the foregoing dangers, which under normal conditions automatically prevents steam from reaching the hose until the cold water line has been turned on, and which maintains water in the hose as protection against leakage of steam to the nozzle in the event of worn or imperfectly seating steam valves. Another object is to provide a mixing unit for use in such hosing apparatus.

Other objects, and objects relating to details of manufacture and to particular aspects of increased safety and reliable operation, will be apparent from the detailed description to follow.

Our invention is defined in the claims. In the claims, as well as in the description, parts may at time be identified by specific names for clarity and convenience, but such nomenclature is to be understood as having the broadest meaning consistent with the context and with the concept of our invention as distinguished from the pertinent prior art. The best mode in which we have contemplated carrying out our invention is illustrated in the accompanying drawings forming part of this specification, in which:

Fig. 1 is a small-scale perspective of the hosing apparatus.

Fig. 2 is a vertical section of the mixing unit shown in Fig. 1, on a larger scale, in a plane extending centrally of the mixing unit.

Reference will first be had to Fig. 1. As a source of hot water the hosing apparatus embodies a wall-mounted mixing unit designated generally by 3 which mixes steam and cold water and passes the resultant hot water to a hose 4 of indeterminate length that leads to a self-closing spray nozzle 5. This nozzle is preferably one such as shown in the aforementioned U. S. Patent 2,657,098. Steam and cold water lines are connected to manually operated valves 6 and 7, respectively, and these valves can be opened and closed as desired to admit steam and cold water to the mixing unit 3 and throttle or cut off the flow thereof. Check valves at 6a and 7a prevent reverse flow to the steam and water lines respectively. Attached to the unit 3 is a hose rack 8 on which the hose 4 may be hung when coiled up and not in use. This hose rack and its manner of attachment to the unit 3 may be the same as that of the hose rack shown and described in the aforementioned U. S. Patent 2,569,857.

Reference will now be had to Fig. 2 which shows the mixing unit 3 in vertical section in a plane parallel to the wall on which it is mounted.

The unit 3 comprises a cast-metal body 10 having opposed aligned steam and water inlets or inlet chambers 11 and 12, respectively. The inlets 11 and 12 communicate with concentric steam and water passages 14 and 15 located centrally of the mixing unit between the inlets 11 and 12 and extending downwardly therefrom. The steam passage 14 terminates in a steam nozzle 16 threadedly engaged with the body, and the water passage 15 extends completely about the steam passage and nozzle. The passages 14 and 15 merge into a mixing bowl 17 at the end of the nozzle 16, the lower end of the mixing bowl being threaded for connection with the hose 4 (see also Fig. 1). Steam and water inlet ports 20 and 21, respectively, communicate with the inlets 11 and 12, respectively.

A reciprocating steam valve member 22 of the poppet type is located axially of the steam inlet 11, the valve 22 closing against a valve seat 24 which may be integral with a bushing 25 received within the mixing unit body and having a lateral opening 26 aligned with the steam passage 14.

The valve member 22 is fixed to a valve stem 27 extending axially of the steam inlet 11, one end 29 of the valve stem extending into the upper portion of the water passage 15. The other end 30 of the valve stem 27 is received within a valve guide 31 which has a frusto-conical surface 33 that makes sealing engagement with a similar surface on the body 10 and forms a closure for the other end of the steam inlet 11. The valve guide 31 is held in position by a collar 32 threadedly engaged with a boss on the mixing unit body 10.

A helical compression spring 34 is located within the valve guide 31 and biases the valve stem 27 and its valve member 22 towards closed position at all times. The space within the valve guide 31 beyond the end 30 of the valve stem occupied by the spring 34 is vented to the steam inlet 11 by a port 35 to equalize the pressure within the steam inlet and within the space occupied by the spring.

The water inlet 12 is formed within a cylindrical member or bushing 36 positioned in a cylindrical bore 38 in the body 10 and making a substantially water-tight fit therewith. The bushing 36 has an open inner end 37 and a lateral opening 39 communicating with the water inlet port 21. The outer end 40 of the bushing 36 has an extended, frusto-conical contour to make sealing engagement with the mixing unit body 10 and prevent leakage to the outside of the body.

The member 36 is held in place by a collar 40' threadedly engaged with a boss on the mixing unit body 10. Preferably, an indexing arrow, not shown, is placed on the outside surface of the outer end of member 36 to indicate the oriented position of the lateral opening 39 with relation to the water port 21.

A piston-type valve member 41 is located at the inner end of the water inlet 12. The valve member 41 has a central passage 42 terminating in a series of lateral openings 44 which, in the so-called closed position of the valve (which is shown in Fig. 2) are blocked by the side walls of the water inlet 12. However, the fit of the piston-type valve member 41 in the member 36 is sufficiently loose to prevent this valve member from, at any time, completely shutting off the flow of cold water to passage 15. The purpose of this will be explained later.

The end 45 of the valve member 41 is located closely adjacent the end 29 of the steam valve stem 27 when both valves are closed. The clearance between the valve end 45 and the stem end 29 is such that, as the piston-type valve member 41 moves to the left from the position shown in Fig. 2 and the ports 44 are just starting to be uncovered, the valve end 45 will press against the stem end 29 and unseat the steam valve member 22. The wall of the water passage 15 opposite the valve 41 arrests the opening movement of the valve 41 at the position in which the ports 44 are entirely or substantially entirely uncovered to provide relatively free flow of water through the water inlet 12 to the mixing bowl 17.

The cross-sectional area of the piston-type valve member 41 is preferably somewhat larger then the area blocked off against the steam pressure by the seated steam valve 22 so that, even though the steam be turned on first, water pressure within the passage 12 will displace the valve member 22 to the left (as viewed in Fig. 2) against the steam pressure so as to "crack" the steam valve. As soon as valve member 22 is displaced from valve seat 24, the pressure on the opposite sides of the valve member 22 will become more nearly balanced and the valve member 41 will continue to move the valve member 22 to the left until valve member 41 is stopped by contact with the opposite wall of the water passage 15, the spring 34 being compressed.

As long as there is substantially greater fluid pressure within the water inlet 12 than in the water passage 15 the valve member 41 will remain in open position and hold the steam valve member 22 open, thus permitting passage of steam into the mixing bowl 17. However, if for any reason the flow of water through the water inlet 12 should stop or should decrease to too small volume—due to a drop in line pressure, to closing of a valve in the water line, or to other cause—the force exerted by the water valve member 41 on the stem of the steam valve 22 will no longer be sufficient to overcome the combined thrust of the spring 34 and the tendency of the valve member 22 to close due to flow of steam. Therefore, both valve members 22 and 41 will move to the right as viewed in Fig. 2, thereby closing both of these valves. As the steam valve member 22 approaches closed position, the differential in steam pressure on the two sides of the valve member will accelerate closing movement of the valves and firmly seat the steam valve.

From the foregoing it will be seen that, under normal conditions, live steam cannot pass to the mixing bowl 17 unless an ample supply of cold water is also passing to the mixing bowl. This is true even though the steam valve 6 be turned on fully and the operator forgets to turn on the water valve 7. Therefore, under normal conditions, the operator is protected against live steam passing to the hose 4 and the nozzle 5. Further, if, during use, the water supply fails or falls to too low a value, the flow of steam to the mixing bowl will be cut off automatically and, in this circumstance too, the operator will be protected against the flow of live steam to the hose 4 and nozzle 5.

Through wear of parts, corrosion of valve seats, or the temporary lodging of foreign matter on the valve seats, any or all of the following valves may leak when nominally closed: water valve 7, steam valves 6 and 22, and the shut-off valve of nozzle 5. So long as water valve 7 is not completely shut off, the loose fit of water valve member 41 allows water to pass and maintain the hose filled with water, thereby preventing leaking steam from filling the hose during periods when the operator has suspended hosing. Thus, even though the steam valves have been leaking meanwhile, the maintenance of the hose in a water-filled state will protect the operator against a blast of steam when he returns to his hosing.

To be sure that water is always available to keep the hose protectively filled with water, a small-flow by-pass B (Fig. 1) may be provided around water valve 7 so that, in effect, this valve cannot be completely shut off. Since the valve of nozzle 5 automatically prevents the discharge of water except when hosing is in progress, the presence of bypass B is not detrimental except when the hose is disconnected. To prevent wastage of water when the hose is disconnected, a manually operated valve V, shown diagrammatically in Fig. 1, may be installed between the mixing bowl and the hose connection, this valve being left normally open but being closed when it is desired to disconnect the hose.

We claim:

1. In apparatus for hosing with hot water, a body having a steam inlet chamber, having a water inlet chamber, having a mixing chamber communicating with both of said chambers and having an outlet, a steam valve in the steam inlet chamber, a steam-valve spring for biasing the steam valve towards closed position, a water valve in the water inlet chamber constructed and arranged to be urged towards open position by flow of water past said water valve, said steam valve and said water valve being so positioned that initial opening movement of said water valve starts the flow of water and continued opening movement of said water valve moves and holds said steam valve open against the bias of its spring, and stoppage of flow of water past said water valve permits both valves to close.

2. Apparatus for hosing with hot water as in claim 1 in which a length of hose is connected to the outlet and the discharge end of the hose is provided with a self-closing nozzle.

3. In apparatus for hosing with hot water, a body having a steam inlet, having a water inlet and having a mixing chamber communicating with the inlets and having an outlet, the inlets being generally aligned and opposed, a poppet-type steam valve member for closing the steam inlet, said steam valve member having a stem extending longitudinally of the steam inlet and terminating adjacent the end of the water inlet, the steam valve member closing in the direction of steam flow and being biased towards closed position, the water inlet extending axially of a cylindrical member having a substantially watertight fit within a cylindrical bore in the body and having an enlarged outer end making a watertight seal with the body about the end of the bore, and a piston-type water valve member reciprocably mounted in the water inlet and adapted to be displaced axially of the inlet towards the steam valve member by pressure of water within the inlet to open the water valve member, the water valve member being axially spaced a short distance from the end of the stem of the steam valve member, whereby movement of the water valve member to open position moves the steam valve member to open position, and stoppage of flow of water through the water inlet permits both valves to close.

4. Apparatus for hosing with hot water as in claim 3 in which a length of hose is connected to the outlet and the discharge end of the hose is provided with a self-closing nozzle.

5. Hosing apparatus comprising: steam and cold water lines, manually operated valves in said lines for turning the steam and water lines on and off, a mixer connected to said lines to mix the steam with the cold water to produce hot water, a length of hose connected to said mixer for receiving the hot water, a self-closing nozzle at the discharge end of the hose, said mixer having a steam valve and a pressure actuated water valve controlling said steam valve preventing the passage of steam to the mixing point until a flow of cold water through the hose has been established, and said mixer being provided with means to keep the hose protectively supplied with water during periods when said manual valves are nominally turned off, as a protection against the leakage of steam occasioned by faulty seating valves.

6. Hosing apparatus comprising: steam and cold water lines, manually operated steam and water valves in said lines for opening and closing the same, a mixing unit having a mixing chamber and communicating with said lines to receive steam and cold water from said lines and convey them to the mixing chamber to produce hot water, a length of hose connected to said mixing unit for receiving the hot water, a self-closing nozzle at the discharge end of the hose, a self-closing steam valve incorporated in the mixing unit to block the passage of steam to the mixing chamber, a water-operated valve incorporated in the mixing unit and operative to feed water to the mixing chamber and thereafter open the self-closing steam valve, a by-pass connection around said water valve in said water line assuring the flow of a measure of cold water to the mixing unit when said water valve in the water line is closed, said water-operated valve constructed to provide a permanently open passage in the mixing unit assuring the flow of a measure of cold water to the mixing chamber under all conditions of said mixing unit and when all of said valves are closed, to keep the hose protectively filled with water and thereby protect the operator against the hose filling with steam under leaky valve conditions.

References Cited in the file of this patent
UNITED STATES PATENTS

| | | |
|---|---|---|
| 611,064 | Demarest et al. | Sept. 20, 1898 |
| 1,113,644 | Jones | Oct. 13, 1914 |
| 1,308,829 | Young et al. | July 8, 1919 |
| 1,842,825 | Cunningham | Jan. 26, 1932 |
| 2,099,563 | Henning et al. | Nov. 16, 1937 |
| 2,308,408 | Wall | Jan. 12, 1943 |
| 2,569,857 | Jaegle et al. | Oct. 2, 1951 |
| 2,657,098 | Strahman | Oct. 27, 1953 |